US006007281A

United States Patent [19]

Eriksson et al.

[11] Patent Number: 6,007,281

[45] Date of Patent: Dec. 28, 1999

[54] METHOD OF PRODUCING HOLES IN FIBER REINFORCED COMPOSITES USING A TOOL WITH A CUTTING HEAD HAVING AN ENLARGED DIAMETER AND REDUCED HEIGHT

[75] Inventors: Ingvar Eriksson, Stockholm; Dag G. Linderholm, Rönninge; Leif V. T. Zackrisson, Bromma, all of Sweden

[73] Assignee: Novator AB, Stockholm, Sweden

[21] Appl. No.: 09/058,061

[22] Filed: Apr. 9, 1998

[51] Int. Cl.$^{6}$ .......... B23C 3/00

[52] U.S. Cl. .......... 409/132; 408/1 R; 409/143; 451/28; 451/61

[58] Field of Search .......... 408/1 R; 451/259, 451/28, 61, 271; 409/131, 132, 66, 74, 143; 407/34, 53, 54

[56] References Cited

U.S. PATENT DOCUMENTS

| | | | |
|---|---|---|---|
| 1,385,750 | 7/1921 | Pollock | 407/54 |
| 2,345,050 | 3/1944 | Jansen | 407/34 |
| 3,739,461 | 6/1973 | Cupler, II | 29/557 |
| 4,190,386 | 2/1980 | Brabetz et al. | 408/1 R |
| 4,338,050 | 7/1982 | Ozer et al. | 408/1 R |
| 4,622,098 | 11/1986 | Ochiai et al. | 156/645 |
| 4,757,645 | 7/1988 | Rudzki | 350/1 |
| 4,798,024 | 1/1989 | Grimm | 451/28 |
| 4,943,191 | 7/1990 | Schmitt | 408/1 R |
| 4,946,321 | 8/1990 | Allemann | 409/132 |
| 4,991,986 | 2/1991 | Wiederkehr | 407/53 |
| 5,226,763 | 7/1993 | Lind | 409/143 |
| 5,285,598 | 2/1994 | Arita et al. | 451/41 |
| 5,316,419 | 5/1994 | Bohnet et al. | 409/143 |
| 5,641,252 | 6/1997 | Eriksson et al. | 409/132 |
| 5,685,674 | 11/1997 | Taquist et al. | 409/132 |
| 5,816,755 | 10/1998 | Thelin | 409/132 |

FOREIGN PATENT DOCUMENTS

| | | | |
|---|---|---|---|
| 1210500 | 3/1960 | France | 407/54 |
| 3029463 | 3/1982 | Germany | 451/61 |
| 52-53594 | 4/1977 | Japan | 451/61 |
| 5-111815 | 5/1993 | Japan | 409/143 |
| 173 899 | 1/1961 | Sweden . | |
| 382 506 | 2/1976 | Sweden | G02B 5/08 |
| 400 916 | 4/1978 | Sweden | B23B 41/00 |
| 2 048 135 | 12/1980 | United Kingdom | B23B 41/04 |

*Primary Examiner*—Daniel W. Howell
*Attorney, Agent, or Firm*—Taylor & Associates, P.C.

[57] ABSTRACT

A method of producing a hole in a fiber reinforced composite material workpiece includes the step of providing a cutting tool having a shaft, a cutting head, and an axis of rotation. The cutting head has a diameter which is substantially smaller than the diameter of the hole that is produced. The shaft has a diameter which is substantially smaller than the diameter of the cutting head. The cutting head has a height which is substantially smaller than the depth of the hole that is produced. The cutting tool is oriented such that the axis of rotation of the cutting tool is substantially orthogonal to the surface of the workpiece. The workpiece is simultaneously machined in both an axial and a radial direction relative to the longitudinal axis of the hole, by simultaneously rotating the cutting tool around the axis of rotation, moving the cutting tool in an axial direction, and moving the cutting tool eccentrically around the longitudinal axis of the hole.

31 Claims, 5 Drawing Sheets

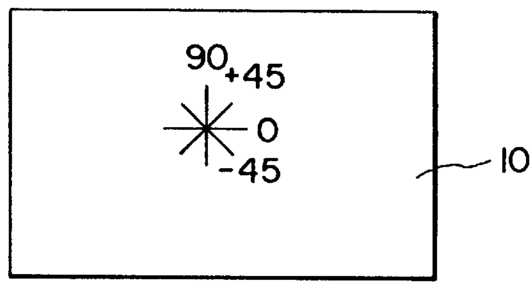
Fig. 1
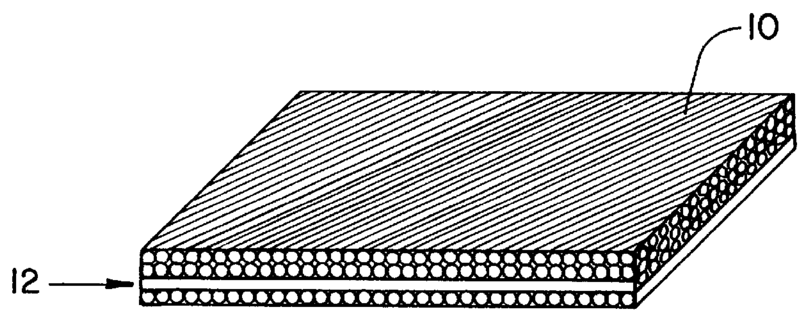
Fig. 2
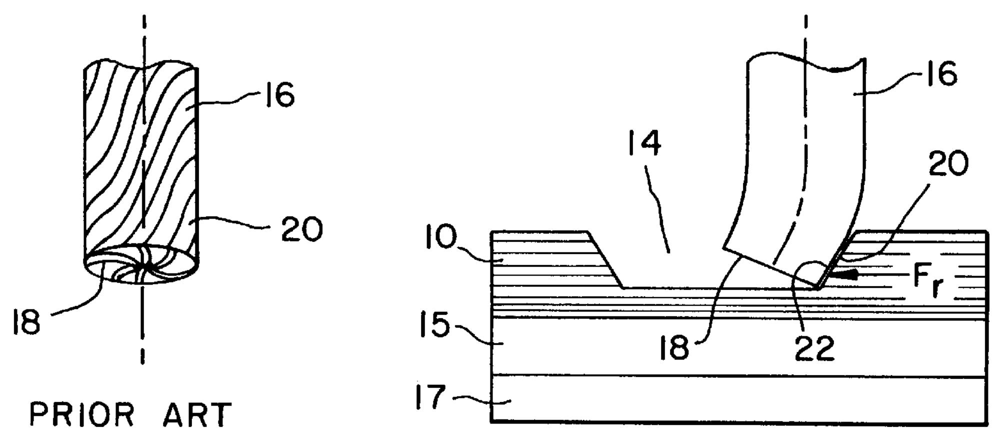
Fig. 3
Fig. 4

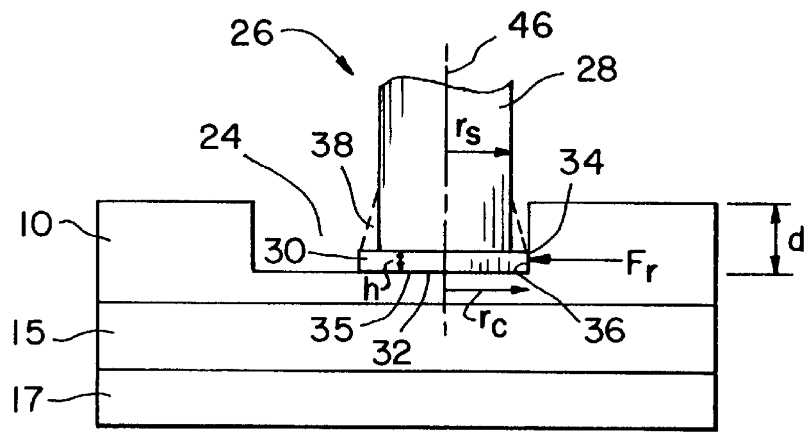
Fig. 5
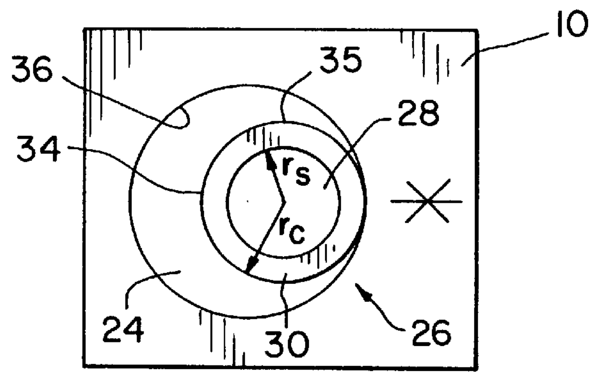
Fig. 6
40
28
44
42
Fig. 7
40
43
42
$r_s$
44
28
w
Fig. 8

METHOD OF PRODUCING HOLES IN FIBER REINFORCED COMPOSITES USING A TOOL WITH A CUTTING HEAD HAVING AN ENLARGED DIAMETER AND REDUCED HEIGHT

BACKGROUND OF THE INVENTION

1. Field of the Invention

The present invention relates to a method and cutting tool for producing a hole or a recess in a workpiece which includes flat or curved sheets of fiber-reinforced composite material, metal or combinations thereof.

2. Description of the Related Art

Structures for aerospace and other applications are often made up of thin curved shells of different material such as aluminum, titanium, stainless steel and fiber-reinforced composite materials. In structural applications different components are often fastened by use of bolted joints. Bolt holes for aerospace structures are typically about 4–20 mm diameter with high quality requirements to secure the integrity of the structure.

Hole requirements are related to dimension and damage. Dimension requirements include, for example, cylindrical hole diameter, height of the cylindrical part of the hole, diameter and angle of countersinks, roundness, and alignment with the normal direction of the surface. Damage related requirements include, among other things, allowable burr height, surface finish and, with regard to fiber-reinforced composites, allowable delamination.

Particular problems occur when drilling holes in fiber-reinforced composites. Polymer composite materials have been generally known since the 1950's. These materials are composed of a protective and binding polymer, either a thermoplastic or a thermosetting plastic, usually referred to as the matrix, together with fibers (e.g. glass, carbon or amide fibers), which may be regarded as a reinforcing material. The fibers may be continuous and oriented in specific directions, or they may be relatively short and arranged at random in the matrix. Composites with continuous and oriented fibers give products with mechanical properties superior to those of conventional polymer and metallic materials, especially as far as their weight-related strength and stiffness are concerned. Composites with shorter fibers find an application where rather less demanding properties are called for. One factor obstructing the wider use of composite materials is the absence of effective methods of cutting machining. The physical and chemical properties of the composite materials mean that known machining methods cannot generally be applied with successful results.

Products consisting of composite material often contain holes for various purposes. These holes may be required, for instance, to permit the laying of service lines, assembly or inspection. Bolt holes are a particularly important category of hole. Structures for practical applications are often constructed from components joined together to produce a finished product. The purpose of the joint is to transfer the load from one structural element to another. One common form of joining is the bolted connection, in which the load is transferred by either shearing loads or tensile loads in the bolt. The strength of a bolted connection is influenced to a considerable degree by the quality and precision of the hole. Reference may be made to three particular problem areas when producing holes in polymer based fiber reinforced composite materials:

1. Low interlaminar strength. When machining laminated composite materials, there is a risk of the layers separating (delaminating) because of the low interlaminar strength. Extensive delamination damage can jeopardize the strength of the laminate.

2. Low resistance to heat and cold of certain thermoplastics. The heat generated during machining can cause the matrix to soften and block the tool, making further machining impossible. In order to achieve good hole quality, it is accordingly necessary to provide effective cooling of the tool/hole edge, and for the material removed by cutting (chips, splinters and grinding dust) to be removed continuously from the hole.

3. High wear resistance of fibers. The cutting machining of the fiber composites causes severe wear of the tool because of the good wear characteristics of the fiber materials. This leads to high wear costs, especially when producing holes with a requirement for high precision.

The methods used to produce holes in composite laminates are traditional drilling, boring, milling, sawing and grinding. The problem associated with these hole-forming methods as they are applied at the present time is that they are not sufficiently effective for various reasons from a technical/economic point of view.

High wear costs are a general problem associated with cutting machining where high precision is required. Great care must be taken when drilling or boring to ensure that delamination damage is avoided on both the entry and exit sides. Special cutters are required in order to achieve the stipulated hole quality, and special procedures must be formulated. In order to avoid extensive delamination damage on the exit side of the laminate, local lateral pressure must be applied around the edge of the hole. Another previously disclosed method of protecting the exit side from damage is to provide the laminate with an additional protective layer.

Sawing is a distinctly unsuitable method for producing holes with high precision requirements. When producing holes by grinding, use is made of a cylindrically shaped tubular body, the machining end of which is coated with a wear-resistant surface layer. Holes are produced by grinding the surface of the material transversely while first causing the grinding body to rotate. The method is slow and gives low precision.

Also disclosed through Swedish Patent Application 9201420-8is a method for forming damage-free holes in fiber-reinforced material by reaming out a pre-formed hole, in conjunction with which the axis of rotation of a grinding body is oriented orthogonally to the longitudinal direction of the fibers at the edge of the hole. The proposed method also differs from previously disclosed surface-modifying hole machining methods in that the volume of material removed by cutting is considerably greater. In the case of hole forming by the radial removal of material, the volume of material removed by cutting is proportional to the change in radius before and after machining. In the case of traditional, surface-modifying machining, the profile depth of the edge of the hole provides a characteristic measure of this change in radius. When machining by the proposed method, the radial extent of any damage defines a lower limit for the difference in radius before and after machining. This lower limit is generally considerably greater than the profile depth of the edge of the hole. It will be appreciated from the foregoing that the size of the pre-formed hole differs significantly compared with the pre-formed hole. A production economic weakness associated with this method is the fact that the presence of a pre-formed hole is required.

It should be pointed out in this respect that hole-machining methods, in which a body driven rotatably about an axis of rotation is also caused to execute an orbital motion (i.e., the axis of rotation is displaced in such a way that the side is able to move relative to the edge of the hole), are generally familiar. SE 173 899 discloses a machine tool having a tool carrier rotating eccentrically about a principal axis, in which the distance between the tool carrier and the principal axis is adjustable. Adjustment of the distance between the tool carrier and the principal axis utilizes a guide components, which rotates about the principal axis together with the tool carrier. The guide component rotating together with the tool carrier is arranged perpendicular to the principal axis and is executed as a cam capable of rotating about it in relation to the tool holder, with the guiding profile of which cam the tool holder is in direct engagement. The advantages of this invention include, among other things, the absence of free play and the space-saving execution of the guide component. SE 382 506 discloses a rotatably driven, combined cutting tool for making holes in stationary workpieces, which holes can be provided with a conical starting chamfer.

Disclosed in the U.S. Pat. No. 5,641,252 (Eriksson et al.), is a method for machining holes in a fiber-reinforced composite material which presents a significant step forward in the art. The central axis of the hole passes through a predetermined point on the surface of the workpiece and is oriented in a certain direction in relation to the longitudinal directions of the fibers in the immediate vicinity of the point. The material is machined simultaneously in both an axial and a radial sense by causing the tool to describe axial motion and rotate not only about its own axis, but also eccentrically about the central axis. This method makes it possible to machine holes without causing delamination in the composite material.

Swedish patent document no. 400 916 discloses a tool for the machining of holes in steel. The cutting tool has a conical cutting head with a sharp point at the distal end. The machining surface of the tool forms an approximately 30 degree angle with the longitudinal axis of the tool and an approximately 60 degree angle with the bottom of the hole being produced. Such a cutting head tends to produce holes with larger diameters at the tops of the holes than at the bottom.

Aerospace and related structures are typically made up of different materials stacked together. Particular problems occur when co-drilling structures including several layers of different materials (material stacks). Such problems include burrs in between the layers, close up holes, and damage in filler material in between layers (liquid shims). Drilling holes using traditional techniques generates heat which may cause rapid wear of the tool. This problem is particularly pronounced when drilling holes in titanium.

Further examples of the prior art are provided by U.S. Pat. Nos. 4,190,386; 4,338,050; 5,685,674 and 4,757,645, which describe methods of producing holes in composite materials, and by GBA-2 048 135, which discloses a method of machining a pre-formed hole to the desired size/geometry.

SUMMARY OF THE INVENTION

The present invention eliminates the shortcomings and limitations associated with previously disclosed methods and permits the rational and cost-effective production of holes, free from strength-reducing damage and burrs, and, in so doing, guarantees repeatably good hole quality. A cutting tool is provided with a cutting head having both a diameter, dimension or width that is substantially larger than the diameter of the attached shaft of the cutting tool and a height that is substantially smaller than the depth of the hole that is produced.

In accordance with one feature of the invention, the workpiece or the tool is oriented in such a way that the axis of rotation of the tool is essentially orthogonal in relation to the longitudinal directions of the fibers in the immediate vicinity of the area of the workpiece being machined, and that the diameter, dimension or width of the cutting head of the tool is substantially smaller than the diameter of the hole that is produced.

The eccentric rotary motion is preferably a strictly rotary motion, i.e., it is executed with a constant distance between the central axis and the axis of rotation of the tool.

The eccentric rotary motion is preferably executed with linear increments, i.e., with varying distances between the central axis and the axis of rotation of the tool.

The method exhibits a number of substantial advantages compared with generally familiar techniques:

1. The method permits the production of holes having constant or uniform diameters along their depths.
2. The method permits the production of holes without strength-reducing damage or burrs.
3. The method permits the production of holes free from damage without first having to pre-form a hole.
4. The method permits the production of holes to tight tolerances. The dimensional accuracy of the hole is determined substantially by the accuracy of positioning the tool relative to a central axis. The requirements imposed on the geometry of the tool are not particularly high, on the other hand, since every individual tool is simply calibrated before use.
5. The method reduces the risk of the tool becoming blocked. Since the diameter of the tool is substantially smaller than that of the hole, the method permits material removed by cutting to be carried away by simple means, for example with compressed air. The method also permits effective cooling of the tool and the edge of the hole.
6. The method substantially reduces the cost of wear compared with previously disclosed methods, thanks to the ability to coat the tool with a wear-resistant material, for instance a diamond coating.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a top view of a sheet of fiber-reinforced composite material with the principal directions of the reinforcing fibers marked;

FIG. 2 is a perspective, sectional view through the sheet in FIG. 1;

FIG. 3 is a perspective, fragmentary view of a prior art cutting tool;

FIG. 4 shows a side, fragmentary section of a prior art method of producing a hole in the sheet in accordance with FIG. 1 using an example of a prior art cutting tool of FIG. 3;

FIG. 5 shows a side, fragmentary section of an embodiment of the method of the present invention of producing a hole in a composite material stack containing the sheet in accordance with FIG. 1;

FIG. 6 is a top view of the method of FIG. 5;

FIG. 7 is a fragmentary, side view of a tool for executing another embodiment of the method of the present invention;

FIG. 8 is a bottom view of the tool shown in FIG. 7;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 11:
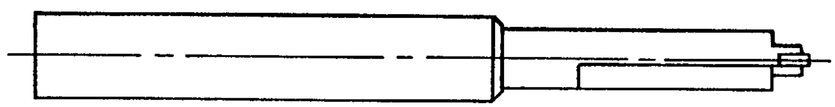
FIG. 11 is a side view of the tool shown in FIG. 9.
Figure 10:
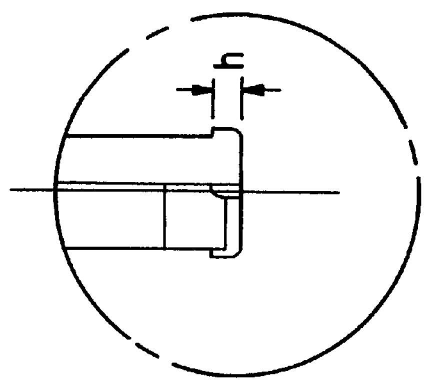
FIG. 10 is an enlarged view of the cutting head of the tool shown in FIG. 9.
Figure 9:
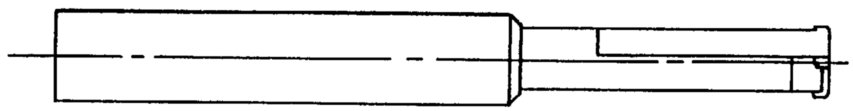
FIG. 9 is a front view of another embodiment of a cutting tool for executing the method of the present invention.
Figure 15:
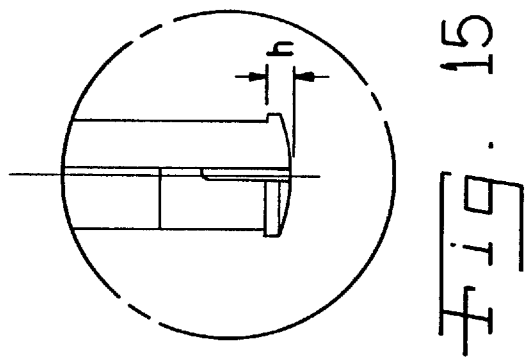
FIG. 15 is an enlarged view of the cutting head of the tool shown in FIG. 14.
Figure 14:
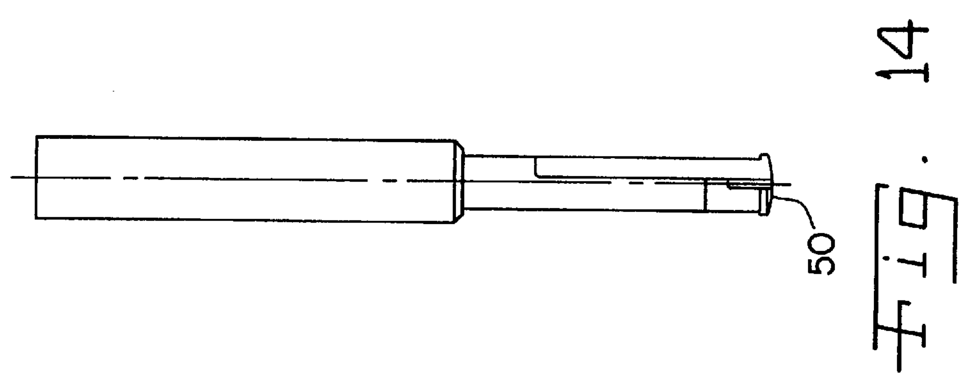
FIG. 14 is a front view of another embodiment of a cutting tool for executing the method of the present invention.
Figure 13:
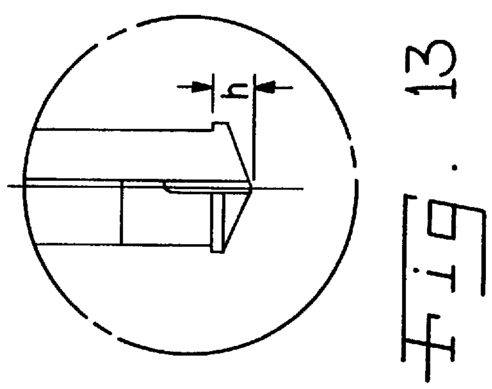
FIG. 13 is an enlarged view of the cutting head of the tool shown in FIG. 12.
Figure 12:
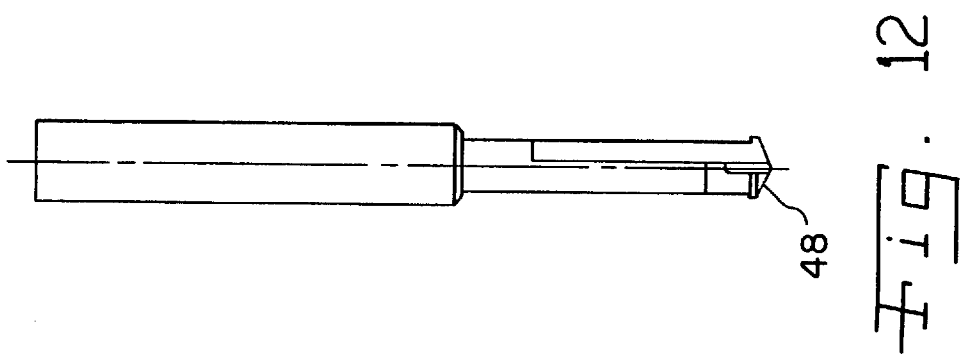
FIG. 12 is a front view of another embodiment of a cutting tool for executing the method of the present invention.

Referring now to the drawings and particularly to FIGS. 1 and 2, a fiber-reinforced composite laminate 10 is built up from a number of lamellae (layers) 12 with continuous fibers, which lamellae are stacked one on top of the other. In the illustrative example, the fibers lie oriented in planes parallel with the plane of the laminate. The directions of the fibers (0, 90, +45 and −45 degrees) are illustrated schematically in FIG. 1. FIG. 2 shows a plate 10 having four lamellae 12. The top lamella 12 is shown as having fibers oriented at a direction of +45 degrees. Each of the bottom three layers has a corresponding one of the other three possible directions (0, 90 and −45 degrees). As can be seen on the side of the plate 10 shown in FIG. 2, a fiber of the bottom layer 12 has a direction of 90 degrees. Similarly, a fiber of the layer 12 directly above the bottom layer (the third layer down) is shown on the front side as having a direction of 0 degrees. Thus, the second layer down has the remaining direction of −45 degrees.

A prior art method of producing a hole 14 in plate 10 is shown in FIG. 4. Plate 10 is shown as being formed of a fiber-reinforced composite material having several layers. Plate 10 is disposed on top of layers 15 and 17, which may be formed, for example, of titanium and aluminum, thereby jointly defining a fiber/metal/metal composite. A substantially cylindrical prior art cutting tool 16 is shown in FIG. 3 in its state when not in use. Cutting tool 16 includes an axial machining surface 18 and a radial machining surface 20. Cutting tool 16 has a diameter substantially smaller than the diameter of the hole 14 that cutting tool 16 produces. As cutting tool 16 machines or cuts against a side 22 of hole 14, side 22 of hole 14 exerts a radial force $F_r$ on radial machining surface 20 of cutting tool 16. Radial force $F_r$ bends and/or deflects the machining end of cutting tool 16 towards the middle of hole 14, as the open space within hole 14 exerts no opposing radial force on tool 16. The bending and/or deflection of tool 16, exaggerated in FIG. 4 for illustration purposes, results in the upper end of side 22 being machined to a greater degree than the bottom end of side 22. Consequently, side 22 slants outwardly from bottom to top. In other words, hole 14 is slightly conical, as the hole diameter at the top of hole 14 is greater than the hole diameter at the bottom of hole 14. This condition is undesirable because a constant or uniform diameter throughout a hole is required in many applications. The problem is particularly significant when machining deep holes with small diameter tools.

The cutting tool of Swedish patent document No. 400 916 would also cause the same types of problems as described above. This cutting tool has a conical cutting head with a sharp point at the distal end. Due to the design of the cutting head, it is clear that the tool is not suitable for machining straight diameter holes in relatively thin sheets since the height of the cutting head is not substantially smaller than the depth of the hole that is produced. In such case the length of the edge in contact with the workpiece will vary through the machining process. The base of the conical cutting head appears to have a diameter only minutely larger than the diameter of the concentric shaft to which it is attached. Any deflection of the cutting head in a radial direction would result in the shaft of the cutting tool contacting the side of the hole, resulting in a widening of the top of the hole as described above. Thus, the tool is not suitable for machining deep holes with small diameter tools where significant deflection is expected. Exacerbating the problem is a sleeve surrounding a portion of the shaft. This sleeve effectively increases the diameter of the shaft to that of the base of the cutting head, or even greater, thereby increasing the likelihood of inadvertent machining of the top part of the hole.

A method of the present invention of producing a hole 24 in plate 10 disposed on top of layers 15 and 17 is shown in FIG. 5. A cutting tool 26 includes a shaft 28 and a substantially concentric cutting head 30, each of which has a substantially circular cross section (FIG. 6). The term "cutting", as used herein, is intended broadly to mean any machining operation for removing material, such as cutting, grinding, filing, etc. Cutting head 30 includes an axial machining surface 32 and a radial machining surface 34, each of which is provided with a cutting or grinding surface with a wear-resistant surface 35 which may include tungsten carbide or diamond. Cutting head 30 has a diameter or width substantially smaller than the diameter of the hole 24 that cutting head 30 produces. For example, the diameter of cutting head 30 can be approximately between 50 and 80 percent of the diameter of hole 24, which hole diameter can range approximately between 0.156 and 1 inch. Further, cutting head 30 has a radius $r_c$ substantially greater than a radius $r_s$ of shaft 28. The required radial difference between the cutting head and shaft depends on the radial deflection of the cutting tool and the depth of the hole. Radial machining surface 34 of cutting head 30 has a height h substantially less than a depth d of hole 24. The required height h is determined by the axial feed rate and the speed of the eccentric rotation. For example, height h can be between 0.7 and 3 millimeters. Depth d of hole 24 can range approximately between 1 and 6 times the diameter of hole 24. Thus, depth d can be approximately between 0.156 and 6 inches. It is possible for shaft 28 to include a bevel 38 (shown in phantom lines in FIG. 5) providing a gradual transition between radius $r_c$ and radius $r_s$ and thereby also providing added bending stiffness to cutting tool 26.

During the machining process, since radius $r_c$ of cutting head 30 is substantially greater than a radius $r_s$ of shaft 28, shaft 28 is prevented from contacting a side 36 of hole 24. As cutting tool 26 machines or cuts against side 36 of hole 24, side 36 of hole 24 exerts a radial force $F_r$ on radial machining surface 34 of cutting tool 26, similarly to the prior art method of FIG. 4, except that side 36 does not also directly exert a radial force on shaft 28. Even if shaft 28 deflects to some extent, the smaller radius of shaft 28 prevents shaft 28 from contacting side 36.

Moreover, because of the relative thinness of cutting head 30, each particular point on side 36 is in contact with radial machining surface 34 for an approximately equal amount of time in the course of the production of hole 24, assuming a substantially constant rate of axial feed. In other words, once cutting head 30 has passed a particular point on side 36 of hole 24, cutting tool 26 will not contact that point of side 36 again. Since shaft 28 is prevented from contacting the hole edge and height h of cutting head 30 is relatively small, radial force $F_r$ is approximately constant throughout the process. This results in hole 24 having a substantially constant and uniform diameter along depth d.

Additionally, the relative thinness of cutting head 30 results in a smaller surface area of cutting tool 26 being in contact with a side 36 of hole 24. Rather than a length of the cutting tool equivalent to depth d being in contact with side 36, only a height h is presented for engagement with side 36. This smaller surface area leads to a proportionately larger lateral pressure being exerted against side 36 of hole 24, which thereby better and more uniformly forms side 36. That is, the machine which drives cutting tool 26 applies both an axial as well as a lateral load to cutting tool 26 of a predetermined value. The resultant pressure (e.g., pounds/inch$^2$) exerted against side 36 by cutting head 30 is a function of the laterally applied force divided by the area in contact between cutting tool 26 and side 36. With a larger area in contact between a conventional cutting tool 16 and side 36, the resultant lateral pressure exerted against side 36 for cutting purposes is smaller. On the other hand, by providing cutting head 30 with a relatively small height h, the surface area in contact between the side of cutting head 30 and sidewall 36 is relatively small, and the resultant lateral pressure exerted against side 36 for lateral cutting is greater.

If height h is sufficiently small, radial force $F_r$ will be substantially constant throughout the machining process since the entire height h will be in contact with the side of the hole. The deflection of the cutting tool will also be substantially constant, resulting in a substantially cylindrical hole. However, if height h is not small, then radial force $F_r$ will vary, as an increasingly greater portion of height h comes in contact with the side of the hole. The deflection of the cutting tool in this case will vary, resulting in a conical hole. If a cutting tool were provided with a sufficiently small height h but the diameter of the shaft were equal to the diameter of the cutting head, then radial force $F_r$ on the cutting head would still be constant, but the shaft would contact the side of the hole. This contact would result in varying deflection of the cutting tool and, hence, a conical hole.

In another embodiment of the method of the present invention, a cutting tool 40 (FIG. 7) is provided with a cutting head 42 in the form of a narrow blade containing at least one cutting edge 43. Blade 42 has a width or dimension w (FIG. 8) that is greater than radius $r_s$ of shaft 28 such that only a radial machining surface 44 of blade 42 is in contact with the side of a hole being produced. Cutting edges 43 could possibly be twisted or curved when viewed along the tool's axis of rotation. The term "width", as used herein, is intended to mean an effective cutting dimension of the cutting tool in a direction substantially perpendicular to the longitudinal axis of the cutting tool, regardless of whether the cutting head is in the form of a grinder, a single cutting blade, a plurality of cutting blades, etc.

Cutting tools of further embodiments of the method of the present invention are shown in FIGS. 9–15. The heights h of the cutting heads of these tools are all small as compared to both the depth of the hole being machined and the widths of the cutting heads. The cutting heads of the tools of FIGS. 12–15 have axial machining surfaces with shapes other than flat. More particularly, the tool of FIGS. 12 and 13 has an axial machining surface 48 which is upwardly slanting towards the radial machining surface. Also, the tool of FIGS. 14 and 15 has an axial machining surface 50 which is convexly shaped. A concavely shaped axial machining surface would also be possible.

Figure 16:
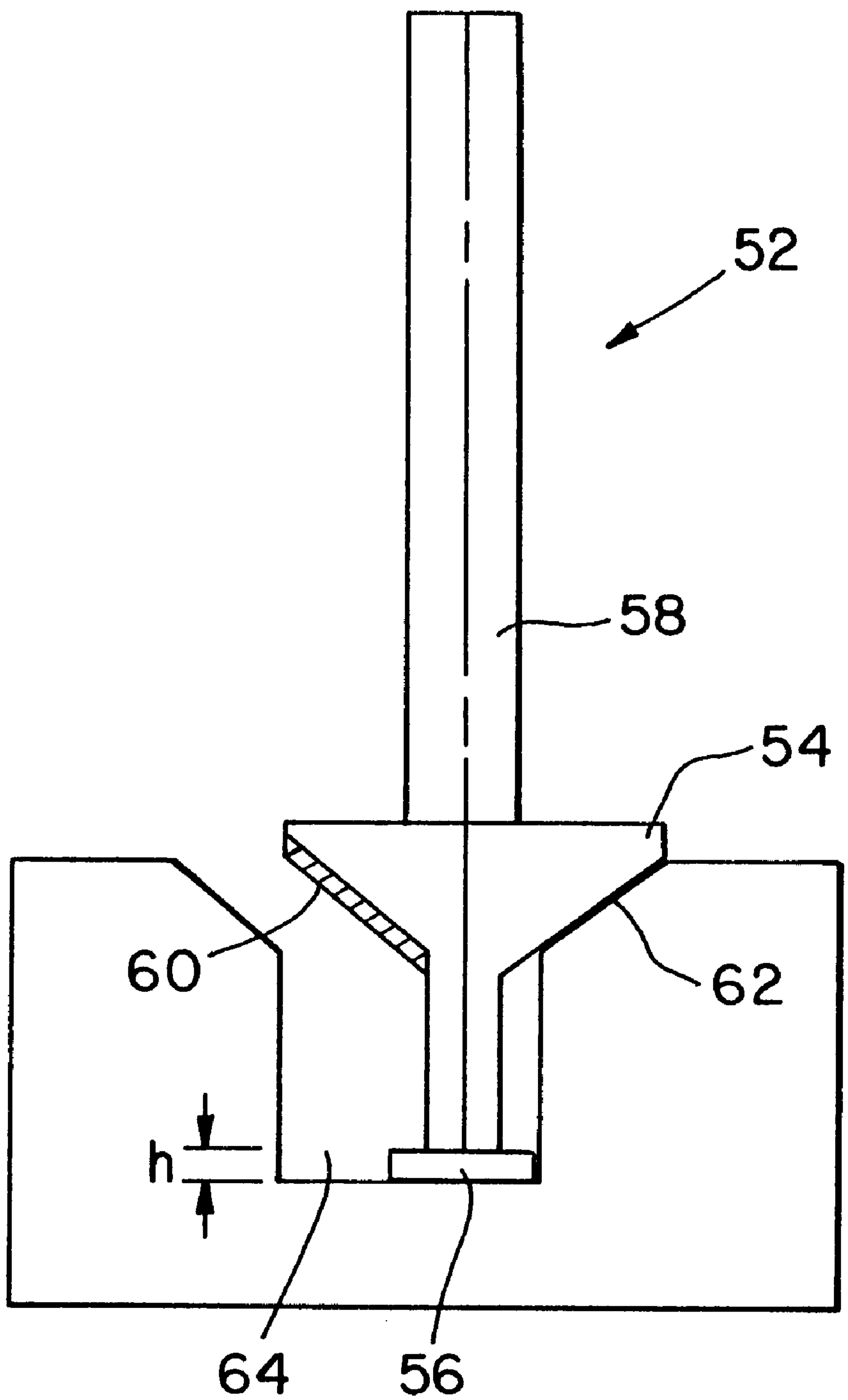
FIG. 16 is a front view of another embodiment of a cutting tool for executing the method of the present invention.

A cutting tool of another embodiment of the method of the present invention is shown in FIG. 16. Cutting tool 52 includes an integrally designed countersink 54 interconnecting a cutting head 56 and a shaft 58. A beveled edge 60 of countersink 54 produces a countersinked widening 62 of hole 64.

Hole 24 is produced by positioning at least one cutting tool 26 eccentrically in relation to the central axis of the envisaged hole. In conjunction with this, the laminate is oriented in such a way that an axis of rotation 46 of the tool is orthogonal to the essential longitudinal directions of the fibers. The material is machined in an axial and a radial sense by causing the tool to execute an axial motion and to rotate not only about its own axis, but also eccentrically about the central axis. The method of the present invention can also be used to widen an existing hole.

The tools in accordance with FIGS. 5–16 are primarily intended for the production of cylindrical holes by the method in accordance with the invention.

The method of the present invention may be applied not only to fiber-reinforced composites, but also, in an alternative embodiment, to metal composite materials including metal reinforced composites, metal-to-metal composites, and metal-to-fiber composites.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of producing a hole in a composite material workpiece, the workpiece being reinforced by a plurality of fibers and having a surface, the hole having a longitudinal axis, a first diameter and a depth, said method comprising the steps of:

providing a cutting tool having a shaft, a cutting head, and an axis of rotation, the cutting head having a second diameter which is substantially smaller than the first diameter of the hole that is produced, the shaft having a third diameter which is substantially smaller than the second diameter of the cutting head, the cutting head having:

a height which is substantially smaller than the depth of the hole that is produced;

an axial machining surface extending substantially continuously across said second diameter; and a radial machining surface;

orienting the cutting tool such that the axis of rotation of the cutting tool is substantially orthogonal to the surface of the workpiece; and simultaneously machining the workpiece in both an axial and a radial direction relative to the longitudinal axis of the hole, by simultaneously rotating the cutting tool around the axis of rotation, moving the cutting tool in an axial direction, and moving the cutting tool eccentrically around the longitudinal axis of the hole.

2. The method of claim 1, wherein each of the fibers has a longitudinal direction, said method comprising the further step of positioning the cutting tool eccentrically relative to the longitudinal axis of the hole, wherein the axis of rotation of the cutting tool is substantially orthogonal to the longitudinal directions of the fibers in the workpiece.

3. The method of claim 1, comprising the further step of providing said cutting tool with a bevel joining said cutting head and said shaft.

4. The method of claim 1, wherein said cutting head has a substantially circular cross section when viewed along the axis of rotation.

5. The method of claim 1, wherein said cutting tool includes at least one cutting edge, said at least one cutting edge being one of straight, twisted and curved when viewed along the axis of rotation.

6. The method of claim 1, wherein said cutting tool includes a countersink connected with said shaft.

7. The method of claim 1, wherein each of the fibers has a longitudinal direction, said method comprising the further step of aligning the longitudinal axis of the hole in a determined direction relative to the longitudinal directions of the fibers in the workpiece.

8. The method of claim 1, comprising the further step of providing the cutting tool with a wear-resistant surface.

9. The method of claim 8, wherein said wear-resistant surface comprises a carbide.

10. The method of claim 9, wherein said carbide comprises tungsten carbide.

11. The method of claim 8, wherein said wear-resistant surface comprises diamond.

12. The method of claim 1, wherein the eccentric movement of the cutting tool comprises strictly rotary motion in which a substantially constant distance is maintained between the longitudinal axis of the hole and the axis of rotation of the cutting tool.

13. The method of claim 1, wherein the eccentric movement of the cutting tool comprises stepwise linear movements in which varying distances occur between the longitudinal axis of the hole and the axis of rotation of the cutting tool.

14. The method of claim 1, wherein each of the shaft, cutting head and axis of rotation are substantially concentric.

15. The method of claim 1, comprising the further step of providing said cutting head of said cutting tool with an axial machining surface and a radial machining surface.

16. The method of claim 1, wherein said second diameter of said cutting head is approximately between 50 and 80 percent of the first diameter of the hole.

17. The method of claim 1, wherein said height of said cutting head is approximately between 1 and 2 millimeters.

18. The method of claim 1, wherein the first diameter of the hole is approximately between 0.156 and 1 inch.

19. The method of claim 18, wherein the first diameter of the hole is approximately between 0.191 and 0.25 inch.

20. The method of claim 18, wherein the depth of the hole is approximately between 1 and 6 times greater than the first diameter of the hole.

21. The method of claim 20, wherein the depth of the hole is approximately between 0.156 inch and 6 inches.

22. A method of producing a hole in a composite material workpiece, the workpiece having a surface and consisting essentially of at least two layers of material, the hole having a longitudinal axis, a first diameter and a depth, said method comprising the steps of:

providing a cutting tool having a shaft, a cutting head, and an axis of rotation, the cutting head having a width which is substantially smaller than the first diameter of the hole that is produced, the shaft having a second diameter which is substantially smaller than the width of the cutting head, the cutting head having a height which is substantially smaller than the depth of the hole that is produced;

orienting the cutting tool such that the axis of rotation of the cutting tool is substantially orthogonal to the surface of the workpiece; and simultaneously machining the workpiece in both an axial and a radial direction relative to the longitudinal axis of the hole, by simultaneously rotating the cutting tool around the axis of rotation, moving the cutting tool in an axial direction, and moving the cutting tool eccentrically around the longitudinal axis of the hole.

23. The method of claim 22, wherein at least one of the layers comprises a fiber-reinforced material.

24. The method of claim 22, wherein said cutting head has a substantially circular cross section when viewed along the axis of rotation.

25. The method of claim 22, wherein said cutting tool includes at least one cutting edge, said at least one cutting edge being one of straight, twisted and curved when viewed along the axis of rotation.

26. The method of claim 22, wherein said cutting tool includes a countersink connected with said shaft.

27. A method of producing a hole in a composite material workpiece, the workpiece having a surface and consisting essentially of at least two layers of material, the hole having a longitudinal axis, a first diameter and a depth, said method comprising the steps of:

providing a cutting tool having a shaft, a cutting head, and an axis of rotation, the cutting head having a second diameter which is substantially smaller than the first diameter of the hole that is produced, the shaft having a third diameter which is substantially smaller than the second diameter of the cutting head, the cutting head having a height which is substantially smaller than the depth of the hole that is produced;

orienting the cutting tool such that the axis of rotation of the cutting tool is substantially orthogonal to the surface of the workpiece; and machining the workpiece in both an axial and a radial direction relative to the longitudinal axis of the hole, by rotating the cutting tool around the axis of rotation, moving the cutting tool in an axial direction, and moving the cutting tool eccentrically around the longitudinal axis of the hole.

28. The method of claim 27, wherein at least one of the layers comprises a fiber-reinforced material.

29. The method of claim 27, wherein said cutting head has a substantially circular cross section when viewed along the axis of rotation.

30. The method of claim 27, wherein said cutting tool includes at least one cutting edge, said at least one cutting edge being one of straight, twisted and curved when viewed along the axis of rotation.

31. The method of claim 27, wherein said cutting tool includes a countersink connected with said shaft.

* * * * *